Sept. 29, 1953 M. M. LEVY 2,654,028

PULSE GENERATING AND SELECTING APPARATUS

Filed Oct. 21, 1948 3 Sheets-Sheet 1

INVENTOR
MAURICE MOISE LEVY
BY
[signature]
ATTORNEY

PULSE GENERATING AND SELECTING APPARATUS

Filed Oct. 21, 1948 3 Sheets-Sheet 2

INVENTOR: MAURICE MOISE LEVY
BY [signature] ATTORNEY

Sept. 29, 1953 M. M. LEVY 2,654,028

PULSE GENERATING AND SELECTING APPARATUS

Filed Oct. 21, 1948 3 Sheets-Sheet 3

INVENTOR
MAURICE MOISE LEVY
BY [signature]
ATTORNEY

Patented Sept. 29, 1953

2,654,028

UNITED STATES PATENT OFFICE 2,654,028

PULSE GENERATING AND SELECTING APPARATUS

Maurice Moïse Levy, Earls Court, England, assignor to The General Electric Company, Limited, London, England Application October 21, 1948, Serial No. 55,731
In Great Britain July 31, 1946

3 Claims. (Cl. 250—27)

The present invention relates to circuits for electric pulses and has for its principal object to provide new or improved circuits for generating pulses, reducing the length of pulses, amplifying pulses, discriminating between pulses in dependence upon their length, and for like purposes, such circuits being relatively simple and economical.

The generation of pulses whose length is only a small fraction of their recurrence period presents considerable difficulty and known circuits for this purpose are relatively complicated. The amplification of pulses by known circuits when more than one stage of amplification is needed is uneconomical since, although when an amplifying valve is to have positive pulses applied to its control grid this valve can be normally biased beyond cut-off so that current flows only during the pulses, in alternate stages a negative pulse is applied to the grid owing to the phase inversion that occurs in successive valve stages. In such stages the normal anode current of the valve must be relatively large and be reduced to zero, or nearly to zero, during pulses. When the pulses are short in relation to the recurrence period, therefore, the average anode current is large and the valve operates very uneconomically.

According to the present invention, a damped oscillation is generated by the shock-excitation of a tuned circuit, an amplitude-limiting device being provided for selecting from the wave of shock-excitation one or more peaks of the oscillation.

The invention will be described with reference to the accompanying drawings, in which.

Figure 16:
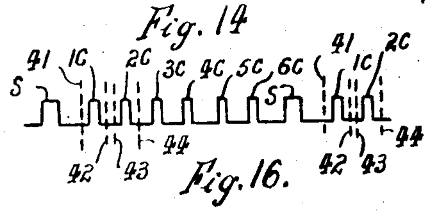
Figure 17:
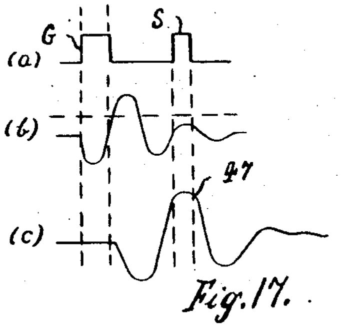
Figure 18:
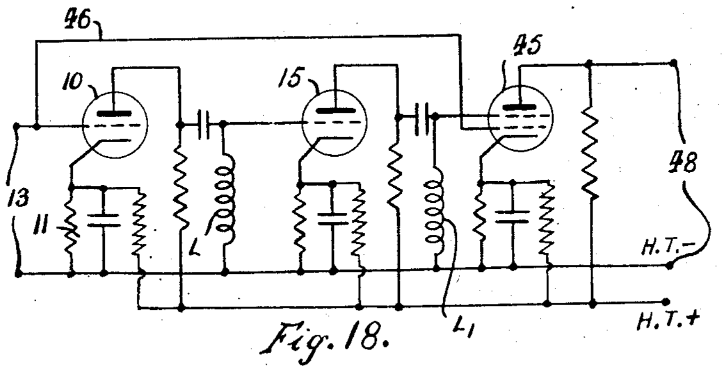

Figures 16 and 17 contain wave-form diagrams illustrating the separation of pulses of different widths; and Figure 18 is a circuit diagram for effecting separation in dependence upon width of pulses using shock excitation.

Figure 1:
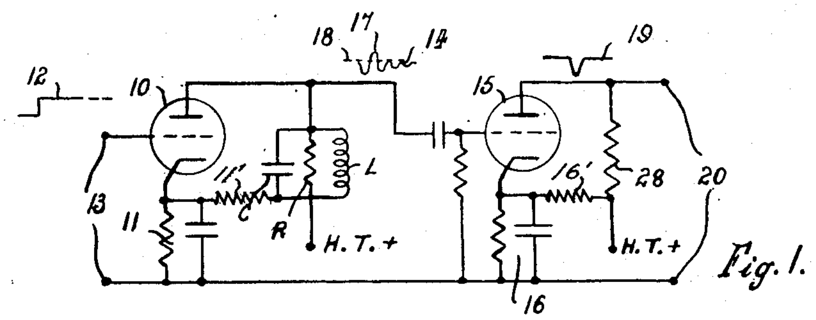
Figure 1 is a simple circuit diagram illustrating the generation of short pulses from various forms of input signal by shock excitation.

Referring to Fig. 1 a valve 10 has in its anode circuit a tuned circuit comprising an inductor L, a resistor R and a capacitor C, all in parallel. The valve 10 is biased by a circuit 11, 11′ to beyond anode current cut-off.

Assuming that a step wave form as shown at 12 is applied to the input terminals 13, there will be generated in the circuit LCR a shock excitation oscillation in the form of a negative half cycle followed by a positive half cycle and a number of further cycles of diminishing amplitude, as indicated at 14. This oscillation, which has a frequency equal to the resonance frequency of the circuit LCR, is applied to the control grid of a valve 15 which is biased by a circuit 16, 16′ in such a manner that only the peak 17 of the first positive half cycle causes anode current to flow in the valve 15. The bias of this valve is, therefore, such that it acts as a limiter and passes only amplitudes exceeding that represented by the dotted line 18. Output pulses of the form shown at 19 are, therefore, produced at the output terminals 20.

Figures 2, 3, 4, 5, 6, 7:
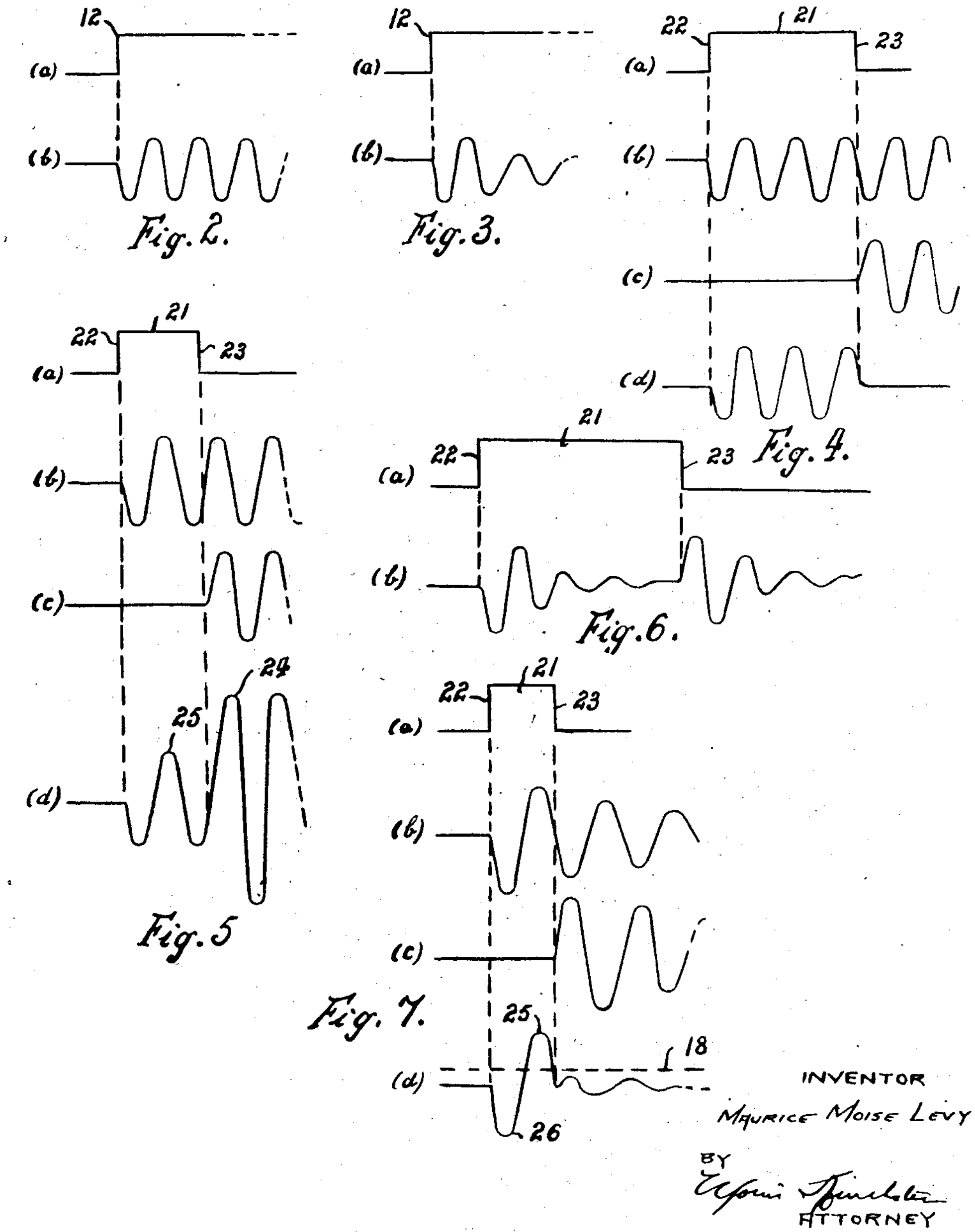
Figures 2 to 9 are wave-form diagrams illustrating various ways of operating the circuit of Figure 1.

In Fig. 2 is shown at (*a*) the step voltage 12 and at (*b*) the wave form generated in the circuit LCR if R is zero, and therefore there is no damping. Fig. 3 shows the conditions when there is some damping.

If the input wave form is, as shown at (*a*) in Fig. 4, a square pulse 21 and if there is no damping, the leading edge 22 produces a wave form as shown at (*b*). The trailing edge 23 produces a wave form which is the same as that at (*b*) but of opposite phase, that is to say the first half cycle is a positive one instead of a negative one. This is shown at (*c*). At (*d*) is shown the resultant voltage at the input to the valve 15 of Fig. 1 when a pulse as at (*a*) in Fig. 4 is applied to terminals 13. This wave form is the sum of those at (*b*) and (*c*) and it will be seen that since the two waves are in opposite phase they cancel one another when they occur simultaneously. Thus at the time of occurrence of the trailing edge 23 the oscillation is suppressed. This occurs when the duration of the pulse is as shown in Fig. 4 equal to an integral number of complete periods of the oscillation.

In Fig. 5 is shown the case where the pulse 21 has a length equal to an integral number of periods plus one half period, in this case one and a half periods. The oscillation generated by the trailing edge 23 shown at (c) is here in phase with that generated by the leading edge 22 shown at (b) and in the resultant shown at (c) there is a doubling of the amplitude, the positive half cycle 24 having twice the amplitude of the preceding positive half cycle 25.

It is therefore seen that when there is no damping, if the length of the initiating pulse is equal to an integral number of periods of the resulting shock excitation, the oscillation is suppressed when the pulse ceases. If, however, the pulse length is one half period more or less than this, there is a doubling of the amplitude of the oscillation when the pulse ceases. When the pulse length differs from the period of oscillation by less than a half cycle, the maximum amplitude will be less than double the amplitude of the first positive peak.

In Fig. 6 is shown one example where the damping in the oscillatory circuit is not negligible. In this case the length of the pulse 21 and the damping are great enough for the oscillation at (b) generated by leading edge 22 to have substantially died away before the end of the pulse, and the trailing edge 23 then generates a wave of like form but of opposite phase.

Fig. 7 shows the results obtained under like conditions to those existing in Fig. 4, that is to say, with the pulse length equal to an integral number (in this case one) of periods of oscillation, but with appreciable damping in the oscillatory circuit. The curves (a) to (d) have the same significance as the curves of like lettering in Fig. 4. It will be observed that the first positive half cycle 25 of the resultant wave form at (d) has approximately the same amplitude as the first negative half cycle 26 and that after the positive half cycle 25 the amplitude is greatly reduced. If, therefore, there be applied to the terminals 13 of Fig. 1 a square wave pulse having a duration equal to one period of the resonance frequency of the circuit LCR, and if the valve 15 be suitably biased, there can be obtained at terminals 20 a pulse of the form shown above the line of amplitude limitation 18 in Fig. 7 (d).

Figure 8:
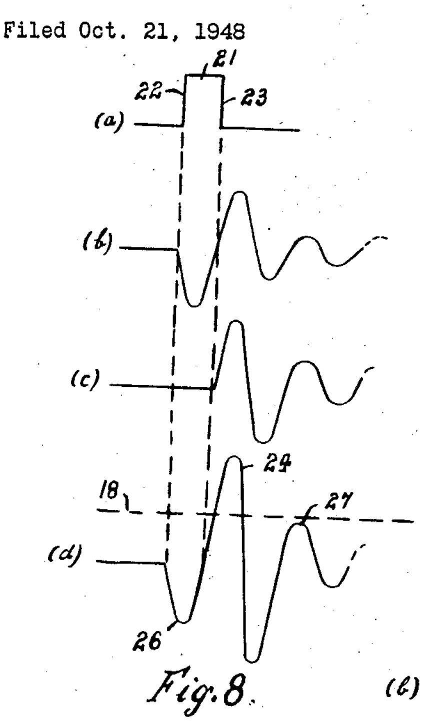

In Fig. 8 is shown the case where there is appreciable damping in the oscillatory circuit and where the length of the pulse 21 is equal to one half period of the oscillation. In Fig. 8 the curves (a) to (d) have the same significance as in Figs. 4, 5 and 7. It will be seen that the effect obtained has a similarity to that of Fig. 5 but that owing to the damping the second positive peak 27 is of substantially smaller amplitude than the first positive peak 24. The amplitude of the positive half cycle 24 is nearly double that of the negative half cycle 26. If, therefore, limiting be arranged to occur at the level 18, single positive pulses 24 of substantial amplitude can be obtained.

Figure 9:
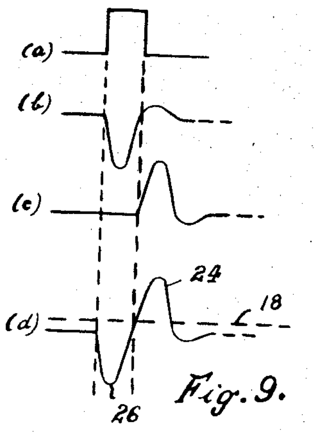

Fig. 9 shows a case which is the same as that in Fig. 8 excepting that the damping has been increased nearly to the critical value. The amplitude of the positive half cycle 24 of the resultant at (d) is substantially smaller than in Fig. 8; it is in fact approximately equal to that of the negative half cycle 26, but the amplitude of the oscillation following the half cycle 24 is also greatly reduced with the result that the pulse 24 extends substantially beyond other positive pulses and can be separated by limitation at 18.

It will be seen from what has been said that if, as is usual, the exciting wave has the form of a pulse, and if, again as will usually be the case, a single pulse is required to be generated by each exciting pulse, the result can be achieved by appropriate choice of the resonance frequency of the tuned circuit in relation to the length of the exciting pulse and of the damping of the tuned circuit. In this way, for instance, the results illustrated at (d) in Figs. 7, 8 or 9 can be obtained.

The damping resistance represented in Fig. 1 by R may be partly or wholly inherent in the inductor L, the anode-cathode path of the valve 10 and the effective shunt resistance of the following grid circuit. Moreover the capacitance of the resonant circuit represented by C may be, and usually will be, wholly or mainly constituted by the inherent anode-cathode capacitance of the valve 10 and the inherent grid-cathode capacitance of the valve 15.

A positive pulse applied to the grid of the valve 10 results in a positive pulse at the grid of the valve 15. If, therefore, the anode resistor 28 is replaced by a further tuned circuit, this will be shock excited in the same manner as the tuned circuit LCR. Thus there may be provided any desired number of stages and in each the valve can be biased beyond anode current cut-off whereby anode current flows only during pulses. The arrangement is, therefore, very economical. By making the resonance frequency of successive tuned circuits progressively higher, pulses of very short duration can be obtained. Moreover, if the pulses applied to the terminals 13 are of varying width (or duration) the circuit can be arranged to generate at the terminals 20 pulses of constant width.

It may not always be convenient or even practicable to arrange that the length of the exciting pulse, the resonance frequency of the tuned circuit and the damping are such as to generate, as has been described with reference to Figs. 7, 8 and 9, single pulses which can readily be separated from other pulses. One example is shown at (c) in Fig. 10, which represents a condition of the type already considered with reference to Fig. 6, and another is shown at (d) in Fig. 10 which represents a condition somewhat resembling that in Fig. 7, but with the length of the pulse 21 of Fig. 7 equal to three periods of the shock excitation oscillation.

Figure 10:
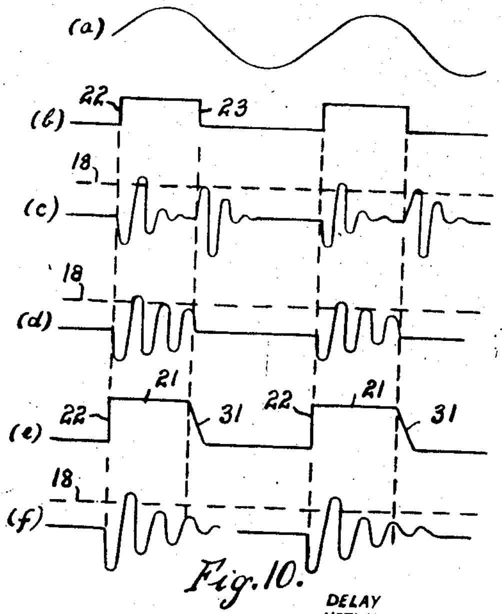
Figure 10 is a wave-form diagram illustrating the operation of the circuit of Figure 11.

In order that there shall be a larger difference in amplitude, the amplitude of the oscillation generated by the trailing edge 23 of the pulse may be reduced by reducing the steepness of the trailing edge 23 as shown at (e) in Fig. 10. One way in which this may be done is illustrated in Fig. 11 which also shows one way in which approximately square pulses can be derived from a sinusoidal input.

Figure 11:
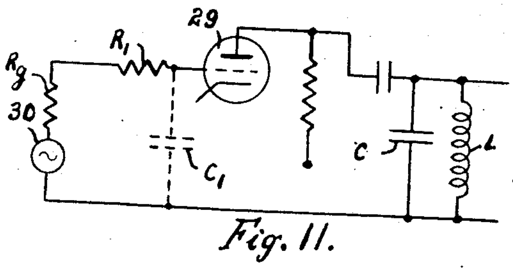
Figure 11 is a circuit diagram of a circuit for obtaining short pulses from a sinusoidal input.

In Fig. 11 a valve 29 has applied to its input a sinusoidal oscillation from a generator 30 whose internal resistance is indicated by $R_g$. A resistance $R_1$ which may be large compared with $R_g$ is provided in series in the input circuit. The grid-cathode capacity of the valve 29 is represented by the dotted condenser $C_1$. A tuned circuit LC to be shock excited is provided in the output of the valve 29. The damping resistance of this tuned circuit is provided wholly by the inherent damping of the circuit. The amplitude of the sine wave voltage (a) Fig. 10 applied to the input of the valve 29 is large enough to drive the valve well beyond saturation and the anode current has approximately the form shown at (b) in Fig. 10.

If the damping of the tuned circuit LC of Fig. 11 is relatively high the voltage across the circuit LC may have the form shown at (c) in Fig. 10; if the damping is relatively low and if the length of the pulses at (b) is an integral number of resonance periods of the circuit LC, a wave form such as that at (d) in Fig. 10 is obtained. It is evident that with the wave form at (c) the adjustment of the limiting means must be very precise in order to obtain a single pulse for each cycle of the wave at (b). With a wave such as that at (d) the damping must be low in order to obtain a reasonable degree of suppression on the occurrence of the trailing edge 23 of the pulse at (b) and when the damping is low, again very precise adjustment of the limiting means is needed.

This difficulty may be overcome by giving the trailing edge of the pulse a smaller steepness as shown at 31 in Fig. 10 (e). Thus referring to Fig. 11, when the sine wave voltage applied to the grid of the valve 29 (Fig. 11) is increasing, the grid-cathode capacitance $C_1$ is charged through the resistors $R_1$ and $R_g$ and the time constant of charging is comparatively short. When the sine wave voltage decreases, however, the source at 30 is arranged to cut off, its impedance being therefore very large, and the time constant of discharge can be made relatively long. In this way the steepness of 31 in Fig. 10 (e) may be made much less than that of 22 and a wave form such as is shown at (f) in Fig. 10 can be obtained.

In some cases it is desired that the recurrence frequency of the pulses generated according to this invention should be variable, for instance by varying the frequency of an applied sine wave oscillation from which the original square wave pulses performing the first shock excitation are derived. It will be evident that special steps must be taken in such cases, owing to the critical relation between the pulse length of the exciting pulse and the resonance freequency of the tuned circuit excited thereby. Such steps may include means whereby the pulse length is maintained substantially constant in spite of changes in the recurrence frequency.

Figure 12:
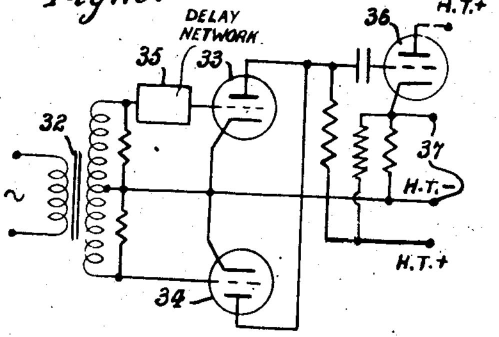
Figure 12 is a diagram of a circuit for maintaining the output pulse length substantially constant in spite of changes in recurrence frequency.
Figure 13:
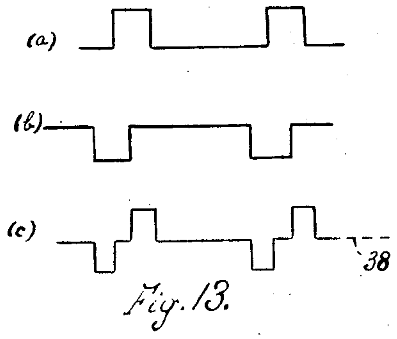
Figure 13 is a wave-form diagram illustrating the operation of the circuit of Figure 12.

A circuit whereby this result may be achieved is shown in Fig. 12 whilst Fig. 13 illustrates the wave form obtained. A sinusoidal oscillation is applied through a transformer 32, in push-pull, to the grid circuits of two valves 33 and 34 whose anodes are connected in parallel. A suitable delay net-work 35 is provided in series in the grid circuit of one of the two valves, in this case the valve 33. Referring to Fig. 13, at (a) and (b) are shown the anode currents in the valves 33 and 34 respectively, these valves being arranged to saturate as described in connection with Figs. 10 (a) and (b). In the absence of the delay network 35 these currents would be displaced in phase by 180° relatively to one another but the delay network is chosen to produce such a phase displacement that the pulses of current in the two anode circuits overlap. At (c) is shown the resultant anode current. The peaks above the dotted line 38 will have a width which is dependent upon the delay in the network 35 but independent of the frequency of the sinusoidal oscillation at 32, assuming that the delay network 35 is designed, as it must be, to produce substantially the same delay for all frequencies over the range of operation.

A cathode follower valve 36 is arranged to pass only the peaks in Fig. 13 (c) and the output is taken at terminals 37.

It has been assumed hitherto that the damping of the tuned circuit is constant throughout the oscillation therein. However, in some cases it is arranged that the damping is not constant; for instance it may be arranged to be substantially greater during positive half cycles than during negative half cycles. One way of achieving this is by allowing the valve, in the grid circuit of which the tuned circuit is disposed, to run into grid current during the whole or a part of the positive half-cycles. This effect can be made large by the use of a cathode-follower valve having a relatively small cathode circuit resistance and little or no additional bias to make the cathode positive relatively to the grid. With such a circuit, no grid current flows during the first negative half cycle of the oscillation, and it has been found possible to arrange that the first positive half cycle of the oscillations may be increased in amplitude, in comparison with circuits in which no grid current flows, whilst the second positive peak substantially disappears.

Figure 14:
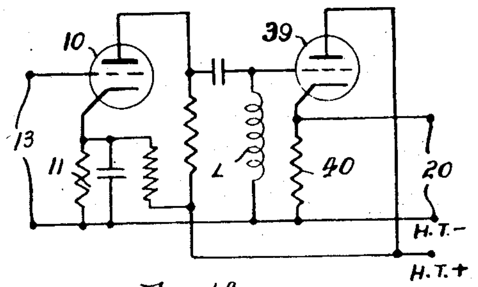
Figure 14 shows a circuit in which the damping during the positive half-cycle of shock excitation is greater than that during the negative half-cycle and in which an input in the form of double pulses may be used.

Use may also be made of double pulses to increase the amplitude of the first positive peak and reduce that of subsequent positive peaks. A circuit employing a cathode follower, in the manner above described, and also double peaks, is shown in Fig. 14 and Fig. 15 illustrates the wave forms associated with this circuit.

Figure 15:
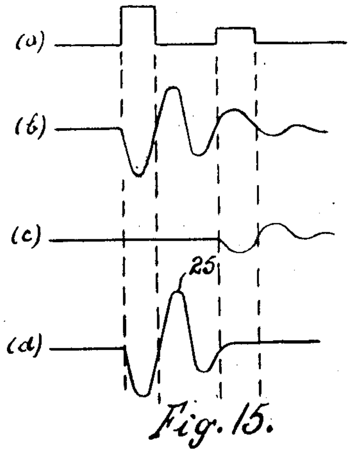
Figure 15 is a wave-form diagram illustrating the operation of Figure 14.

The valve 10 has applied to its input terminals 13 double pulses such as are shown in Fig. 15 (a). These may be derived, for example, in accordance with the invention by arranging the level of limiting lower than heretofore described and thus passing the first and second positive peaks instead of only the first peak. The resonance frequency of the circuit generating the double pulses and other conditions thereof are chosen in such a manner that the two pulses have the requisite spacing and width as will hereinafter appear. The double pulse of anode current produced in the valve 10 shock-excites the tuned circuit represented by L, the capacitance and resistance of this circuit being assumed as being inherent in the circuit, and the damping including grid current damping in a cathode follower valve 39 having the output taken at terminals 20 across a relatively low cathode circuit resistor 40.

In Fig. 15 (b) is the wave form generated at the terminals 20 by the first pulse at (a), (c) is that generated by the second pulse at (a) and (d) is the resultant wave form at terminals 20, namely the sum of (b) and (c). It will be seen that the second pulse is used to decrease the amplitude of the second positive peak and later peaks. When full advantage is taken of the grid current damping above referred to as well as the double pulse, the relative amplitude of the first positive peak at (d) can be made substantially greater than is shown without increase in later peaks.

Although particular reference has been made to the use of square wave or trapezoidal pulses to shock-excite a tuned circuit, pulses of many other wave forms can be used, for instance triangular pulses.

There is a substantial advantage in using automatic cathode bias circuits in carrying out the invention, particularly the amplitude limiting, since the resulting pulses are then found to be of a shape and amplitude which is substantially unaffected by relatively large changes in H. T. voltage.

The invention has been described with special reference to the generation and amplification of simple trains of pulses but is applicable to other purposes also. For example, it may be applied to the amplification of pulses in multi-channel signalling systems and to the selection of desired pulses in such systems.

Referring to Fig. 16, there is illustrated the wave form of a six-channel system, this wave form comprising synchronising pulses S and channel pulses 1C, 2C, 3C, 4C, 5C, 6C. The pulses 1C belong to one channel of communication and they are modulated as desired, for instance by time modulation in which their time of occurrence is varied between limits indicated by the dotted lines 41 and 42. The pulses 2C belong to the second channel and are varied between limits defined by the dotted lines 43 and 44 and so on for the other four channels. The limits of modulation such as 41 to 42 and 43 to 44 are suitably spaced to avoid cross-talk.

It will be evident that channel pulses 1C, 2C, etc. of Fig. 16 can be amplified by applying them to a circuit such as that of Fig. 1, the resonance frequency of the tuned circuit, the damping etc. being suitably chosen as already described. Care is of course taken to arrange that the damping is sufficient and that only single pulses are passed by the limiting means, in order to avoid cross-talk. In general, a value of Q for the tuned circuit of the order of unity is found to be required.

The invention can also be used for pulse width discrimination, for example, for selecting the broader synchronising pulses S of Fig. 16 from the channel pulses. Thus, for instance, the conditions can be made those represented in Fig. 8 (*d*) for the synchronising signals, whereas for the narrower channel pulses, the positive peaks do not extend above the line of limitation 18.

One disadvantage of this arrangement for selecting synchronising pulses by pulse width discrimination is that since the width of the output pulse is not constant throughout the amplitude the effective position and width thereof changes with changes in the level of limitation. It is therefore preferred to use the pulses derived by width selection as above described to open a "gate" through which synchronising pulses can pass, the "gate" being closed when other pulses are present. In this way the wave form of the synchronising pulses can be preserved. By delaying the synchronising pulses (where this is permissible) by a suitable delay network relatively to the pulses, generated therefrom by shock-excitation, which are applied to open the "gate" it can be arranged that each synchronising signal opens its own "gate." Preferably, however, a selector pulse is provided in the signal occurring at a suitable time before the occurrence of each synchronising signal as shown in Fig. 17 (*a*), where the selector pulse is indicated at G and the synchronising pulse at S.

A circuit whereby such a signal can be applied to the purpose in view is shown in Fig. 18. The signal of Fig. 17 (*a*) (with other pulses—for example channel pulses—of different width) is applied to input terminals 13 and the tuned circuit represented by L, together with inherent capacitance and damping resistance, is arranged to generate in response to the selector pulse G a positive peak substantially exceeding in amplitude any positive peaks generated by the synchronising signal S or channel pulses. This positive peak is selected by the limiting valve 15 and shock-excites the tuned circuit $L_1$ (with associated inherent capacitance and resistance) and the positive pulse so obtained is applied to the outer grid of a valve 45, this grid being normally held at a fixed negative potential relatively to the cathode. The signal applied to terminals 13 is also applied through a connection 46 directly to the inner grid of the valve 45. The arrangement is such that signals applied to the inner grid produce substantially no change in the anode current of the valve 45 unless the outer grid is made positive by the presence of a positive pulse thereon. The positive pulse is applied to the outer grid only in response to the selector pulse G (Fig. 17) and is arranged to render the valve 45 responsive for a suitable period during and just before and after the occurrence of a synchronising pulse S (Fig. 17) on the inner grid. In Fig. 17 there is shown at (*b*) the wave form applied to the grid of the valve 15 and at (*c*) the wave form applied to the outer grid of the valve 45. It is seen that during the occurrence of the pulse S at (*a*) the "gate" constituted by the valve 45 is opened by the pulse 47. The wave form of the synchronising signals appearing at output terminals 48 is thus substantially the same as their wave form at the terminals 13 whilst all other pulses are suppressed. The pulses G and S may, if desired, be of the same width.

Instead of using a single "gating" pulse G there may be used a series of pulses, for instance two or three, so spaced that a gating pulse such as 47 in Fig. 17 can be generated from the series of pulses in the manner described with reference to Fig. 15. In a time-modulated multi-channel signalling system, it is usually preferable to use more than two pulses in the series which replaces G (Fig. 17) in order to avoid the risk of false actuation of the gate by channel pulses which move towards and away from one another according to their modulations and may at times have the same spacing as the pulses of the said series.

As already indicated, an important application of the invention is to the generation of pulses of very short length. This can be done by using a suitable number of stages, such as the stages including valves 10 and 15 in Fig. 18 for example, in cascade.

In one example, four such stages are used, the last being followed by a cathode follower valve (as at 39 in Fig. 14 for example). Since a certain amount of the negative-going part of the oscillation at the grid of the cathode follower is passed to the output side thereof through the grid-cathode capacitance, a second cathode follower may be provided connected in cascade with the first.

A sine wave oscillation of frequency 160 kc./s. is applied to the input and is squared as described. The first tuned circuit has a resonant frequency 1.4 mc./s. and a Q of about 6; the second a resonance frequency of about 7 mc./s. and a Q of about 20; the third a resonance frequency of about 12.5 mc./s. and a Q of about 8; whilst the last tuned circuit is resonant at 15 mc./s. and has a Q of about 3 or 4. The pulses so obtained have a length of approximately one hundredth of a micro-second and their recurrence frequency is, of course, that of the original sine wave oscillation, namely 160 kc./s. The amplitude of the output pulse is of the order of 18 volts in 17 ohms resistance.

The production of still shorter pulses is difficult with equipment at present available owing to the inherent capacitances and inductances of the circuits.

Since all connecting wires have inductances of appreciable value at the high frequencies involved, they constitute, with stray capacities, tuned circuits which are shock-excited by the pulses therein and so generate spurious oscillations. In order to suppress such spurious oscillations a low pass filter may be arranged in the output.

The present invention is also applicable to the broadening of pulses, that is to say, increasing their duration. For this purpose the tuned circuit which is shock-excited by the pulses to be broadened has a relatively low resonance frequency, the duration of the positive half cycle being considerably longer than the duration of the exciting pulses. A suitable limiter is provided and adjusted to select the peak of this positive pulse and reject other pulses. The resulting pulse is then squared as already described. It can be arranged by suitable damping that the said positive pulse exceeds the amplitude of the positive half cycle generated by the trailing edge of the exciting pulse. In this case little can be achieved by any particular selection of the relation between the wavelength of shock-excitation oscillations and the duration of the exciting pulse.

It is found possible in this way to generate nearly rectangular pulses having a duration two or three times that of the exciting pulse. By providing a suitable plurality of stages in cascade, any desired broadening can be achieved.

I claim:

1. A circuit arrangement for separating pulses of longer duration from pulses of shorter duration, said arrangement comprising a tuned circuit, means for applying said pulses of longer and shorter duration to shock-excite said tuned circuit and generate from each pulse of long or short duration a wave of shock-excitation, said waves having peaks of amplitude depending upon the duration of said pulses, amplitude-limiting means for selecting peaks generated by said pulses of longer duration, a gating device having an input terminal, an output terminal, a control voltage terminal and an electrically controllable variable coupling interconnecting the input and output terminals, said coupling being variable between a condition in which it passes a signal without mutilation of its waveform and a condition in which it blocks passage of a signal between said terminals, said coupling normally being in its second condition, means connecting the control voltage terminal to the coupling for control of said coupling, means for applying said pulses of longer and shorter duration to said input terminal, and means for applying said peaks to said control voltage terminal to change the coupling from its second to its first condition and thereby permit the transmission of only said pulses of longer duration to said output terminal.

2. A circuit arrangement for selecting desired recurrent pulses from a complex signal consisting of said desired pulses, a gating signal, including at least one pulse, in fixed time relation to each of said pulses, and other voltage variations, said arrangement comprising a tuned circuit, means for applying said complex signal to said tuned circuit to generate waves of shock-excitation, said waves having peaks of amplitude which are greater for said gating signal than for said other voltage variations, amplitude-limiting means for selecting said peaks generated by said gating signals, a gating device having an input terminal, an output terminal, a control voltage terminal and an electrically controllable variable coupling connecting the input and output terminals, said coupling being variable between a condition in which it passes a signal without mutilation of its waveform and a condition in which it blocks passage of a signal between said terminals, said coupling normally being in its second condition, means connecting the control voltage terminal to the coupling for control of said coupling, means for applying said peaks to said control voltage terminal to change the coupling from its second to its first condition and thereby permit the passage through the gating device of only said desired pulses.

3. A circuit arrangement for selecting desired recurrent pulses from a complex signal consisting of said desired pulses, a gating signal in the form of a gating pulse preceding each desired pulse by a fixed time interval, and other voltage variations, said arrangement comprising a tuned circuit, the duration of said gating pulse being an odd integral multiple of one half-resonance period of said tuned circuit, means for applying said complex signal to said tuned circuit to generate waves of shock-excitation therein, amplitude-limiting means to select peaks of said waves generated by said gating pulse, a gating device having an input terminal, an output terminal, a control voltage terminal and an electrically controllable variable coupling interconnecting the input and output terminals, said coupling being variable between a condition in which it passes a signal without mutilation of its waveform and a condition in which it blocks passage of a signal between said terminals, said coupling normally being in its second condition, means connecting the control voltage terminal to the coupling for control of said coupling, and means for applying said complex signal to said gating device including means for applying said peaks to said control voltage terminal to change the coupling from its second to its first condition and thereby permit the passage through a gating device of only said desired pulses.

MAURICE MOÏSE LEVY.

References Cited in the file of this patent

UNITED STATES PATENTS

| Number | Name | Date |
|---|---|---|
| 2,181,309 | Andrieu | Nov. 28, 1939 |
| 2,401,807 | Wolff | June 11, 1946 |
| 2,403,624 | Wolff | July 9, 1946 |
| 2,411,547 | Labin | Nov. 26, 1946 |
| 2,414,968 | Moe | Jan. 28, 1947 |
| 2,434,920 | Grieg | Jan. 27, 1948 |
| 2,434,922 | Grieg | Jan. 27, 1948 |
| 2,442,769 | Kenyon | June 8, 1948 |
| 2,462,061 | Beatly | Feb. 22, 1949 |
| 2,468,058 | Grieg | Apr. 26, 1949 |
| 2,471,836 | Norgaard | May 31, 1949 |
| 2,484,352 | Miller et al. | Oct. 11, 1949 |
| 2,549,776 | Cleeton | Apr. 24, 1951 |
| 2,570,236 | Hoeppner | Oct. 9, 1951 |